Sept. 10, 1935.  E. ALTENKIRCH  2,014,096
ABSORPTION REFRIGERATING APPARATUS
Original Filed April 13, 1926
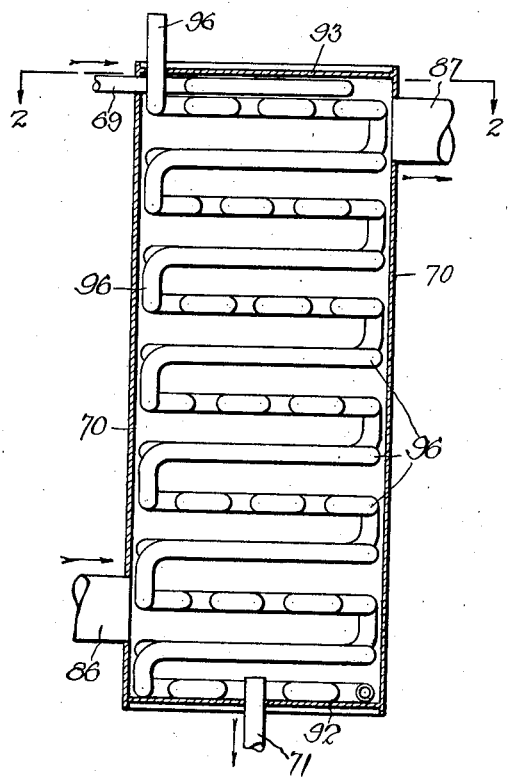
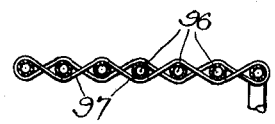
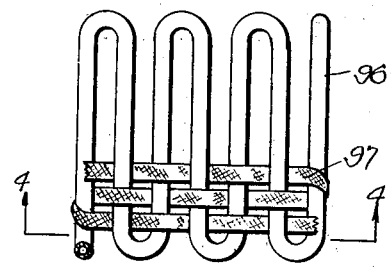
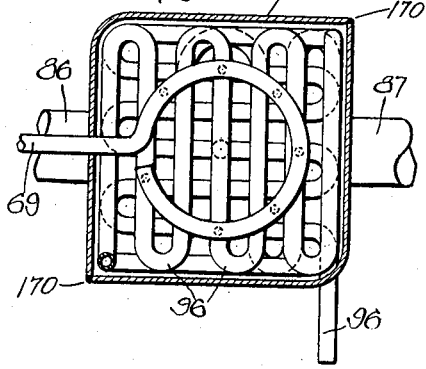

Patented Sept. 10, 1935

2,014,096

UNITED STATES PATENT OFFICE 2,014,096

ABSORPTION REFRIGERATING APPARATUS

Edmund Altenkirch, Neuenhagen near Berlin, Germany, assignor to The Hoover Company, North Canton, Ohio, a corporation of Ohio Original application April 13, 1926, Serial No. 101,745. Divided and this application May 25, 1933, Serial No. 672,755. In Germany April 23, 1925

2 Claims. (Cl. 261—106)

This invention relates to absorption refrigerating apparatus and more particularly to the construction of the absorber thereof, and the manner of cooling the same.

This application is a divisional application of my copending case Serial No. 101,745 filed April 13, 1926, for absorption machine which has now matured into United States Patent No. 1,976,593 granted October 9, 1934, and which corresponds to an application filed in Germany on April 23, 1925.

It is an object of the present invention to provide an absorber of simple construction and one suitable for use in a low pressure refrigerating system, although the absorber may be used to advantage in systems operating at higher pressures as well.

Another object of the invention is to provide an absorber suitable for use in a continuous absorption refrigerating system employing an inert gas.

Another object of the invention is to provide improved cooling means for bringing a fluid which conducts heat away from the absorber into intimate contact with the absorption solution and refrigerant therein, and for successively bringing the absorption solution into contact with the refrigerant and with this fluid. Other objects and advantages reside in certain novel features of the arrangements and construction of the parts as will be apparent from the consideration of the following specification taken in connection with the accompanying drawing in which:

Figure 1 is a vertical cross-sectional view of an absorber constructed in accordance with the principles of the invention.

Figure 2 is a horizontal cross-sectional view of the absorber of Figure 1.

Figure 3 is a fragmentary plan view of a cooling coil showing how liquid retaining means is associated therewith, and Figure 4 is a vertical cross-sectional view of the device of Figure 3 taken on the line 4, 4 thereof.

For convenience substantially the same reference characters are used in this application as are used in the parent case application 101,745 referred to above. Referring to the drawing in detail, it will be seen that the absorber consists of a metallic shell 70 which may be made up of two rectangular pieces of heavy sheet material, welded together at their edges as indicated at 170 in Figure 2 and having their central angled portions curved as indicated in Figure 2. This particular arrangement provides a shape suitable to make the shell conform with the cooling coils located therein and is an advantageous construction where the pressure in the unit is not materially different from that of the atmosphere. Of course, where it is intended to employ the absorber in a higher pressure apparatus, the horizontal cross-section of the absorber should be circular. The shell 70 of the absorber is provided with heads 92 and 93 which are welded thereto, as indicated in Figure 1. Absorption solution is supplied to the top of the absorber by conduit 69 which may be bent around and provided with a number of holes as indicated in Figure 2 to form a rosette for distributing the solution over liquid retaining means in the absorber. Conduit 71 provides means for draining absorption solution from the lower end of the absorber.

In the construction illustrated, inert gas is supplied to the bottom of the absorber through the inert gas conduit 86, while the conduit 87 at the top thereof provides means for conveying inert gas away from the absorber. The circulation of inert gas through the absorber provides means for conveying refrigerant gas from the evaporator (not shown) to the absorber, as disclosed in parent application 101,745.

The absorber illustrated is water cooled, a water conduit or pipe 96 entering the absorber vessel through the end plates 93 at the top and leaving through the side wall 70 near the bottom thereof. This pipe is reversely bent in numerous planes within the absorber. The cooling water enters either at the top or the bottom and flows through the entire pipe 96.

In order to distribute the solution supplied to the absorber 69 over as large a surface as possible a broad wick of fibrous or asbestos material is woven over the bends of the pipe 96 as illustrated in Figures 3 and 4, the wick being designated 97. It will be apparent from this construction that as the liquid trickles downwardly from the pipe 69 over the cooling coils 96 and leaves through the conduit 71, it is successively brought into contact with the refrigerant gas and inert gas passing upwardly from the conduit 86 to the conduit 87, the solution gradually becoming richer as it flows downwardly and being cooled by the cooling pipe 96 as it comes in contact therewith in the various planes of the pipe 96. Because of the gravity flow the strong solution collecting at the bottom of the absorber does not mix with the weaker solution entering at the top.

In Figures 1 and 2 this wicking material 97 is not shown, it being desirable to delete this from these figures for the purposes of clarity.

While the absorber of the present application is designed primarily for use in connection with an apparatus such as that disclosed in my co-pending application Serial No. 101,745 referred to above (which is now open for public inspection having been referred to in Patent No. 1,767,639) the invention is not to be regarded as limited or restricted for use in that type of apparatus as it may be used in various other types of constructions well known to those skilled in the art, without departing from the spirit of the invention or the scope of the annexed claims.

I claim:

1. In a continuous absorption refrigerating apparatus, an absorber comprising a closed vessel, means for supplying absorption liquid thereto and for removing absorption liquid therefrom, means for supplying refrigerant gas to said vessel, liquid retaining means in said vessel to provide an extended surface therein adapted to bring the absorption liquid and the refrigerant gas into intimate contact at a plurality of places in said vessel, cooling means in said vessel associated with said liquid retaining means and adapted to cool the fluids therein at said plurality of places and means for circulating a cooling fluid through said cooling means, said cooling means comprising a number of bends of pipe, said liquid retaining means being supported by said pipe.

2. In a continuous absorption refrigerating apparatus, an absorber comprising a closed vessel, means for supplying absorption liquid thereto and for removing absorption liquid therefrom, means for supplying refrigerant gas to said vessel, liquid retaining means in said vessel to provide an extended surface therein adapted to bring the absorption liquid and the refrigerant gas into intimate contact at a plurality of places in said vessel, cooling means in said vessel associated with said liquid retaining means and adapted to cool the fluids therein at said plurality of places and means for circulating a cooling fluid through said cooling means, said cooling means comprising a number of bends of pipe and said liquid retaining means comprising material interwoven with said pipe.

EDMUND ALTENKIRCH.